Patented Aug. 12, 1930

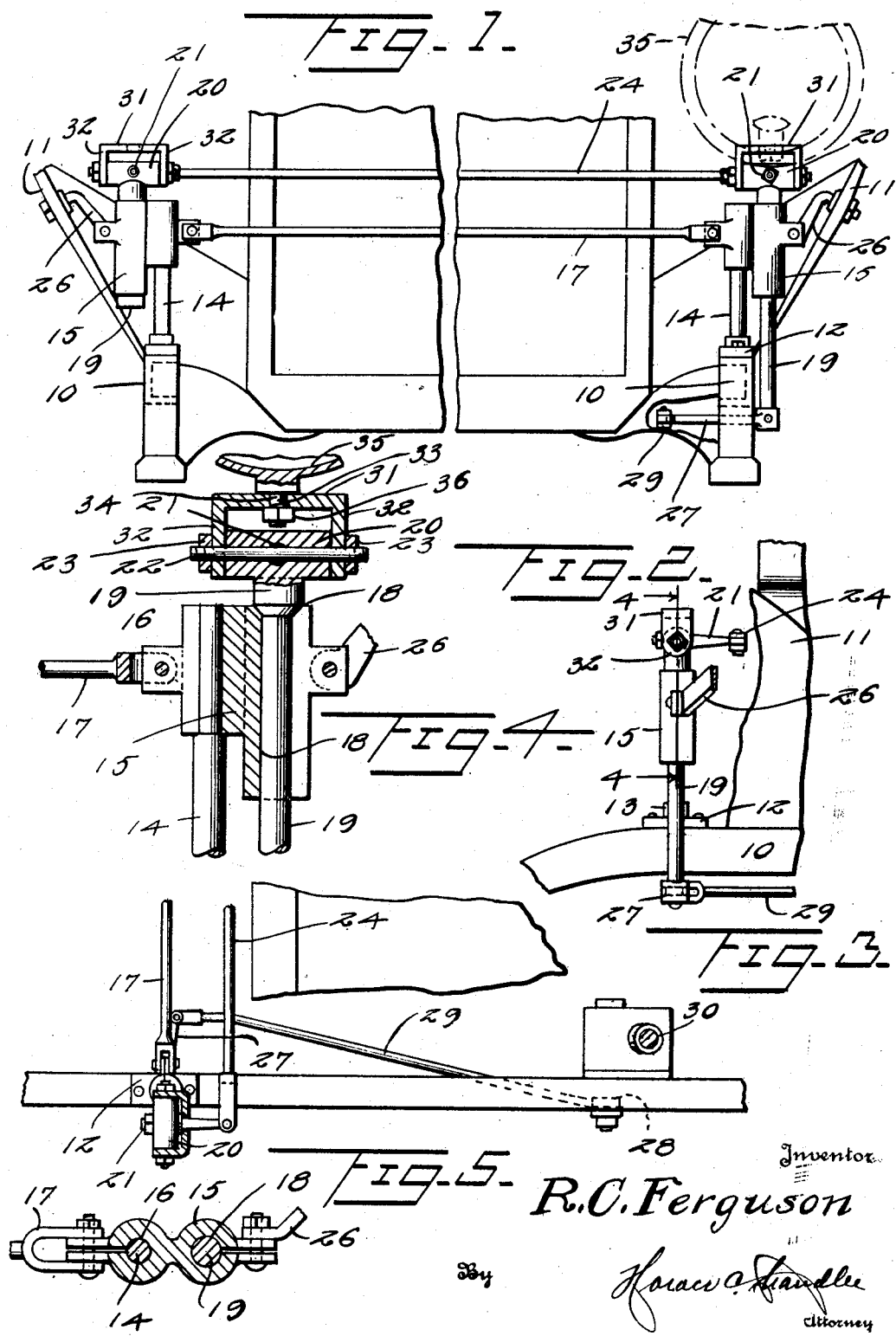

1,772,660

UNITED STATES PATENT OFFICE

RALEY C. FERGUSON, OF WIBAUX, MONTANA

HEADLIGHT

Application filed October 17, 1928. Serial No. 313,142.

This invention relates to new and useful improvements in headlights for automobiles, and particularly dirigible headlights therefor.

One object of the invention is to improve and simplify the construction of the mechanism through which the headlights are turned by the steering column of the automobile.

Another object is to provide a novel and improved means for mounting the headlights and for holding them in proper position on the automobile.

A further object is to provide a device of this character wherein the headlight casings are capable of adjustment for the purpose of elevating or depressing the light with respect to the road ahead of the automobile.

Other objects and advantages will be apparent from the following description when taken in connection with the accompanying drawing.

In the drawing:

Figure 1 is a front elevation of an automobile showing the improved headlights mounted thereon.

Figure 2 is a side elevation, partly broken away, showing the connections with the steering mechanism.

Figure 3 is a fragmentary top plan view of the mechanism, also showing the connections with the steering mechanism.

Figure 4 is an enlarged vertical sectional detail view on the line 4—4 of Figure 2.

Figure 5 is a horizontal sectional view on the line 5—5 of Figure 4.

Referring particularly to the accompanying drawing, 10 represents the forward ends of the side members of the chassis of an automobile, and 11 the front mud-guards thereof. Mounted on the upper face of each of the said chassis end portions is a block 12, having a step bearing 13 therein, in which is disposed the lower end of the post or upright 14. A double tubular member 15 receives the upper end of the upright 14 in one of its bores 16, said member being in the form of a clamp whereby to tightly engage said upright. Secured in the split of the clamp is one end of a brace rod 17, which has its other end secured in the corresponding clamp of the other headlight device, at the other side of the automobile, whereby to hold the two double tubular members against relative movement. Rotatably disposed in the other bores 18, of the members are the vertical lamp posts 19, the upper end of each of which carries a transversely disposed tubular member 20, and disposed transversely through the center of each member 20 is the apertured end of a bolt 21. Engaged through the said bolt and within the bore of said member 20, is a bolt 22. Threaded on each end of the bolt 22 is a nut 23, to which further reference will be made later herein. The rear end of the bolt 21 projects beyond the rear side of the member 20 and has pivotally connected thereto one end of a rod 24, which extends transversely of the front of the automobile, and is similarly connected with the bolt 22, of the other headlight device. The outer side of the other tubular portion of the member 15 is provided with a clamp to which is connected an end of a brace arm 26, carried by the mud-guard 11 adjacent thereto.

The post 19, of the left headlight of the automobile extends downwardly below the chassis of the automobile, and secured on the lower end thereof is a laterally extending arm 27. Forming a part of the steering mechanism of the automobile is the depending steering arm 28, and pivotally connected to the lower end thereof is the rear end of a link 29, the forward end of which is pivotally connected to the outer end of the arm 27. As the steering column of the automobile, as indicated at 30, is rotated in one direction the arm 28 will move in one direction to rotate the posts 19 whereby to direct the light from the headlights in the direction of the inner side of a curve in a road, while rotation of the column in the other direction will rotate the posts 19 in the other direction. Thus when the automobile is rounding a curve in a road, the headlights are turned so as to throw the light toward the inner side of the curve. Ordinarily the headlights of an automobile shine straight ahead, and at such a distance that the immediate portion of the road curve, ahead of the automobile is indistinct, thus rendering it dangerous.

A casing, indicated as a whole by the numeral 31, has the depending apertured side portions 32, which are engaged on the opposite ends of the bolt 22, at the ends of tubular member 20. The upper wall of the casing is provided with an opening 33 through which is disposed the lower threaded end of the stem or stud bolt 34, carried by the lower side of the headlight lamp casing 35, a nut 36 being engaged on the said stem to clamp the casing 35 on the casing 31.

Upon loosening the nuts 23, the casing 31, together with the lamp casing 35, and the bolt 22 may be tilted forwardly or rearwardly, whereby to increase or diminish the length of the light rays emanating from the lamps, the screwing up of the said nuts serving to tightly clamp the casing 31 in its adjusted position with respect to the tubular member 20.

What is claimed is:

A support for a dirigible and inclinably adjustable headlight including a vertical rotatably supported post having a transverse tubular head, said head having a transverse opening intersecting the bore thereof, an arm having a threaded end disposed in said transverse opening and having an opening registering with the bore of the tubular member, a bolt disposed in the bore and through the opening of the arm and having its ends projecting from the ends of the tubular member, clamping nuts on the ends of said bolt, and an angular inverted U-shaped casing adapted to support a headlight casing and having apertured side portions engaged with the ends of the tubular member and receiving the bolt ends therethrough and the nuts thereagainst, whereby to permit forward and rearward rocking adjustment of the U-shaped casing on said bolt, for the purpose of regulating the light projection from the headlight.

In testimony whereof, I affix my signature.

RALEY C. FERGUSON.